US012768801B2

(12) United States Patent
Jones et al.

(10) Patent No.: US 12,768,801 B2
(45) Date of Patent: Oct. 20, 2026

(54) PATH-INTEGRATED X-RAY IMAGES FOR DIGITAL IMAGE CORRELATION

(71) Applicant: National Technology & Engineering Solutions of Sandia, LLC, Albuquerque, NM (US)

(72) Inventors: Elizabeth M. C. Jones, Cedar Crest, NM (US); Caroline Winters, Cedar Crest, NM (US); Enrico C. Quintana, Albuquerque, NM (US); Benjamin Roberts Halls, Albuquerque, NM (US); Samuel Saiid Fayad, Urbana, IL (US); Dayna Glen Obenauf, Lancaster, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 512 days.

(21) Appl. No.: 18/229,030

(22) Filed: Aug. 1, 2023

(65) Prior Publication Data

US 2024/0159689 A1 May 16, 2024

Related U.S. Application Data

(60) Provisional application No. 63/421,719, filed on Nov. 2, 2022.

(51) Int. Cl.
*G01N 23/04* (2018.01)
*G01N 23/083* (2018.01)

(52) U.S. Cl.
CPC .......... *G01N 23/04* (2013.01); *G01N 23/083* (2013.01); *G01N 2223/401* (2013.01)

(58) Field of Classification Search
CPC . G01N 23/04; G01N 23/083; G01N 2223/401
See application file for complete search history.

(56) References Cited

U.S. PATENT DOCUMENTS

2014/0098936 A1* 4/2014 Grossnickle ......... G01N 23/087 428/209

* cited by examiner

*Primary Examiner* — Courtney D Thomas
(74) *Attorney, Agent, or Firm* — Yee & Associates, P.C.; Mario A. Burgarello

(57) ABSTRACT

Digital image correlation is provided. The method comprises applying two or more unique X-ray attenuating patterns to a number of test samples and then applying physical deformation to the test samples. The test samples are irradiated concurrently with an X-ray source, and a path-integrated composite X-ray image is recorded that superimposes the unique X-ray attenuating patterns on each other. According to the path-integrated composite X-ray image, the method determines respective deformation of each of the unique X-ray attenuating patterns produced by the physical deformation of the test samples.

23 Claims, 13 Drawing Sheets

PATH-INTEGRATED X-RAY IMAGES FOR DIGITAL IMAGE CORRELATION

STATEMENT OF GOVERNMENT INTEREST

This invention was made with United States Government support under Contract No. DE-NA0003525 between National Technology & Engineering Solutions of Sandia, LLC and the United States Department of Energy. The United States Government has certain rights in this invention.

BACKGROUND

1. Field

The present disclosure relates generally to imaging techniques and more specifically to digital image correlation.

2. Background

Digital Image Correlation (DIC) is an optical, non-contact technique that provides displacement and deformation measurements on surfaces of solid parts. It is length- and time-scale independent, making it a versatile diagnostic, and literature is available that documents the best practices for obtaining DIC measurements with reduced uncertainty. Since its development in the 1980s, DIC has matured and been applied to challenging environments, including heated samples, fire-environments, explosives, and fluid-structure interactions. However, traditional optical DIC has proven challenging in applications where spatio-temporal gradients in the indices of refraction dominate the apparent DIC pattern deformation. In such circumstances, these gradients result in beam-steering effects that produce inaccurate displacements in the images. The resulting errors depend on details of the experimental setup but can reach up to 220 μm of false displacements and 5000 μm/m of false strains from heat waves, and 10-50 μm of false displacements induced by a shock wave. Additionally, the presence of fire, smoke, or other obstructions might severely limit or block optical access, preventing optical DIC measurements.

Therefore, it would be desirable to have a method and apparatus that take into account at least some of the issues discussed above, as well as other possible issues.

SUMMARY

An illustrative embodiment provides a method of digital image correlation. The method comprises applying two or more unique X-ray attenuating patterns to a number of test samples and then applying physical deformation to the test samples. Physical deformation may include warping and/or rigid body motion. The test samples are irradiated concurrently with an X-ray source, and a path-integrated composite X-ray image is recorded that superimposes the unique X-ray attenuating patterns on each other. According to the path-integrated composite X-ray image, the method determines respective deformation of each of the unique X-ray attenuating patterns produced by the physical deformation of the test samples.

Another illustrative embodiment provides method of digital image correlation. The method comprises applying two or more unique X-ray attenuating patterns to a number of test samples and applying physical deformation to the test samples. The test samples are irradiated concurrently with an X-ray source, and a path-integrated composite X-ray image is recorded of the unique X-ray attenuating patterns superimposed on each other. The method determines respective deformation of each of the unique X-ray attenuating patterns produced by the physical deformation of the test samples according to an approximation of the Beer-Lambert law that expresses intensity of the path-integrated composite X-ray image as a function of X-ray attenuation through the test samples.

Another illustrative embodiment provides a method for digital image correlation. The method comprises designing two or more unique extrinsic X-ray attenuating patterns, wherein the unique extrinsic X-ray attenuating patterns have unique Fourier signatures. The unique extrinsic X-ray attenuating patterns are applied to surfaces of a number of test samples. Applying physical deformation is then applied to the surfaces of the test samples. The test samples are concurrently irradiated with an X-ray source, and a path-integrated composite X-ray image is recorded of the unique extrinsic X-ray attenuating patterns superimposed on each other. A two-dimensional (2D) fast Fourier transform (FFT) is applied to the path-integrated composite X-ray image. Two or more masks are applied to the 2D FFT of the path-integrated composite X-ray image to filter two or more sets of specified regions of the image to create two or more masked Fourier domain images. An inverse 2D FFT is then applied to the Fourier domain images to generate recovered images. The method determines respective deformation of each of the unique X-ray attenuating patterns produced by the physical deformation of the surfaces of the test samples according to digital image correlation of the recovered images.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
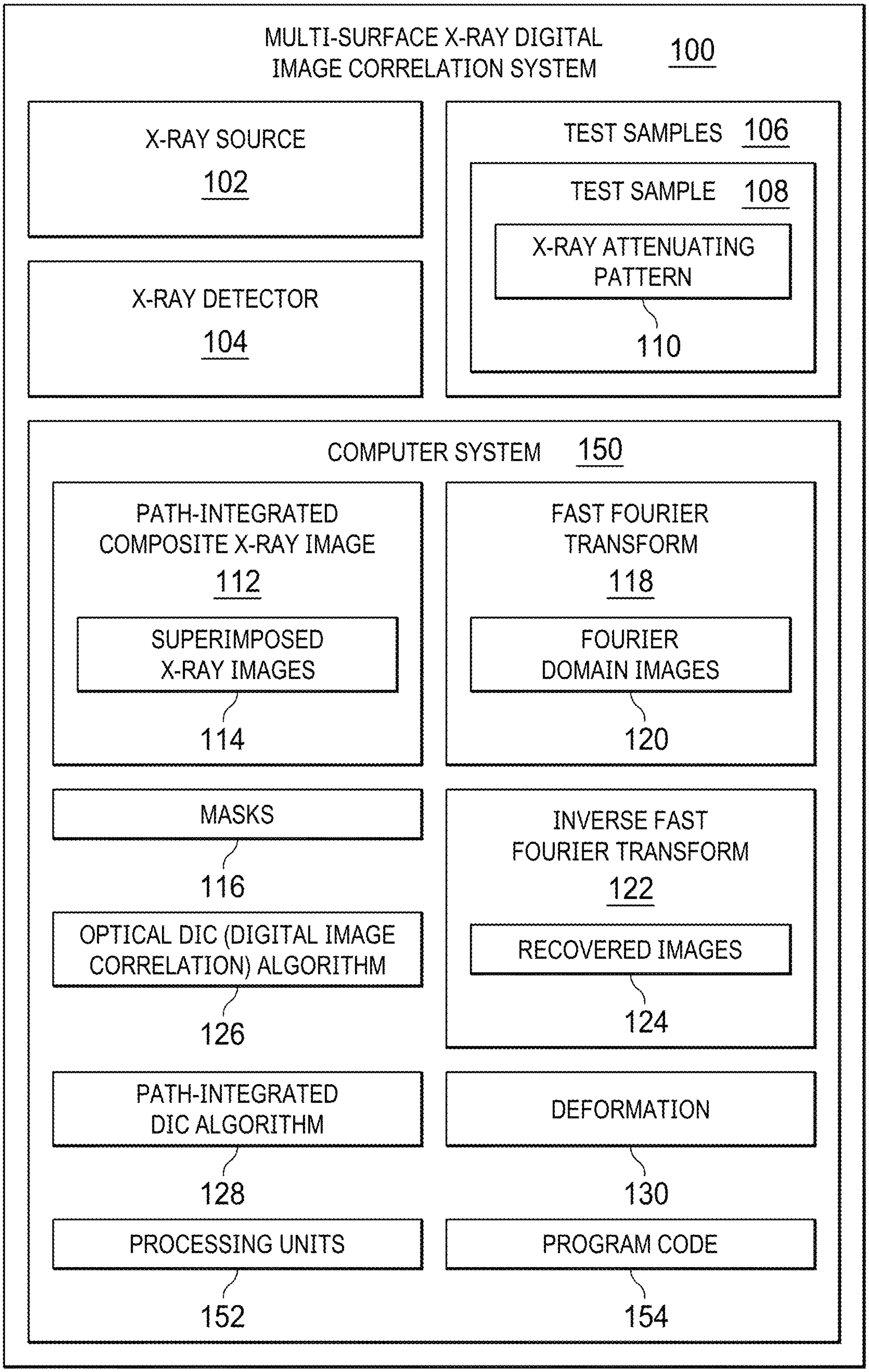
FIG. 1 depicts a block diagram of a multi-surface X-ray digital image correlation (DIC) system in accordance with an illustrative embodiment.

The illustrative embodiments recognize and take into account that traditional optical DIC has proven challenging in applications where spatio-temporal gradients in the indices of refraction dominate the apparent DIC pattern deformation. In such circumstances, these gradients result in beam-steering effects that produce inaccurate displacements in the images. Furthermore, the presence of fire, smoke, or other obstructions might severely limit or block optical access, preventing optical DIC measurements.

The illustrative embodiments also recognize and take into account that X-ray imaging is insensitive to several optical obscurations such as gas or fluid density gradients, occluded surfaces, and particulate clouds. As such, X-ray DIC has been used in the past to overcome the limitations of optical DIC in challenging environments. An X-ray DIC experiment is composed of the X-ray source that emits photons that partially transmit through the environment (including the sample) and impinge upon the X-ray detector. As such, image pixel intensity corresponds to the transmitted X-ray intensity. To create an extrinsic X-ray DIC pattern, a dense (high-Z) material is applied in a random pattern to a surface of interest on or within the sample. The applied material absorbs more X-ray photons than the rest of the sample, resulting in a contrasted pattern similar to the black and white speckle patterns common to traditional optical DIC. From there, standard optical DIC correlation algorithms are used with a straight-forward substitution of X-ray images for optical images.

The illustrative embodiments also recognize and take into account that X-ray images are path-integrated, meaning the final image intensity is a function of X-ray attenuation through all components between the X-ray source and the X-ray detector. In order to maintain conservation of intensity—the fundamental principle of optical DIC algorithms—of path-integrated images, only a single surface of interest can be patterned for X-ray DIC measurements. If more than one surface/object moves during the test, conservation of intensity is violated, and standard DIC algorithms fail. This requirement placed on so-called "single-surface" X-ray DIC is challenging to meet in practical experiments and restricts the information garnered from a test.

The illustrative embodiments also recognize and take into account that an alternative technique to measure bulk media deformation is Digital Volume Correlation (DVC), which tracks the change of an internal structure—either the natural pattern of a heterogeneous specimen, or an applied pattern such as seeding dense particles—to provide volumetric displacements and strains. However, DVC is restricted to quasi-static tests, since hundreds to thousands of views of the sample are required at each load step to generate the volumetric reconstructions.

The illustrative embodiments provide an approach called Path-Integrated DIC (PI-DIC), which reformulates the matching criterion for DIC to express the intensity of the path-integrated image as a function of X-ray attenuation through multiple patterned surfaces based on an approximation of the Beer-Lambert law, thereby resolving the conservation of intensity violation for independent deformation of multiple surfaces contributing to a path-integrated image.

The illustrative embodiments also provide an approach of performing DIC measurements on multiple path-integrated surfaces, denoted Frequency-Multiplexed DIC (FM-DIC). In contrast to PI-DIC, FM-DIC uses standard matching criteria and commercial DIC software developed for optical DIC, after an initial image pre-processing step. FM-DIC extends the utility of other frequency separation techniques such as the Frequency Recognition Algorithm for Multiple Exposures (FRAME) technique. The illustrative embodiments provide two methods to generate and separate overlapped patterns in the Fourier domain based on the success of the FRAME technique. The first method starts with a random pattern in the Fourier domain, and the frequency information is then split using masks to generate two spatial images. Both images retain the masked frequency regions and are thereby separable. The second method starts with a controlled pattern in the Fourier domain, and then frequencies that are readily masked are isolated and separated into two spatial images. Both methods follow similar image processing steps.

FIG. 1 depicts a block diagram of a multi-surface X-ray digital image correlation (DIC) system in accordance with an illustrative embodiment. Multi-surface X-ray DIC system 100 comprises an X-ray source 102 that irradiates a number of test samples 106. Each test sample 108 comprises a unique X-ray attenuating pattern 110, which might be extrinsic and applied to a surface of a test sample or intrinsic formed through the test sample.

The test samples 106 are positioned in tandem between the X-ray source 102 and an X-ray detector 104 to produce a path-integrated composite X-ray image 112, which comprises superimposed X-ray images 114 of the separate test samples 106 and their respective X-ray attenuating patterns 110.

Computer system 150 in multi-surface X-ray DIC system 100 can process the path-integrated composite X-ray image 112 a number of ways to determine deformation 130 in the test samples 106. One approach applies fast Fourier transform (FFT) 118 to the path-integrated composite X-ray image 112 to generate Fourier domain images 120. Masks 116 are applied to the Fourier domain images 120, and then the inverse FFT 122 is taken to generate recovered images 124 that can be analyzed by a standard optical DIC algorithm 126 to calculate deformation 130.

Alternatively, path-integrated composite X-ray image 112 can be analyzed by a path-integrated DIC algorithm 128 (explained below) to determine deformation 130.

For both approaches, deformation in the test samples may include warping and/or rigid body motion.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 150 is a physical hardware system and includes one or more data processing systems. When more than one data processing system is present in computer system 150, those data processing systems are in communication with each other using a communications medium. The communications medium can be a network. The data processing systems can be selected from at least one of a computer, a server computer, a tablet computer, or some other suitable data processing system.

As depicted, computer system 150 includes a number of processor units 152 that are capable of executing program code 154 implementing processes in the illustrative examples. As used herein a processor unit in the number of processor units 152 is a hardware device and is comprised of hardware circuits such as those on an integrated circuit that respond and process instructions and program code that operate a computer. When a number of processor units 152 execute program code 154 for a process, the number of processor units 152 is one or more processor units that can be on the same computer or on different computers. In other words, the process can be distributed between processor units on the same or different computers in a computer system. Further, the number of processor units 152 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 2:
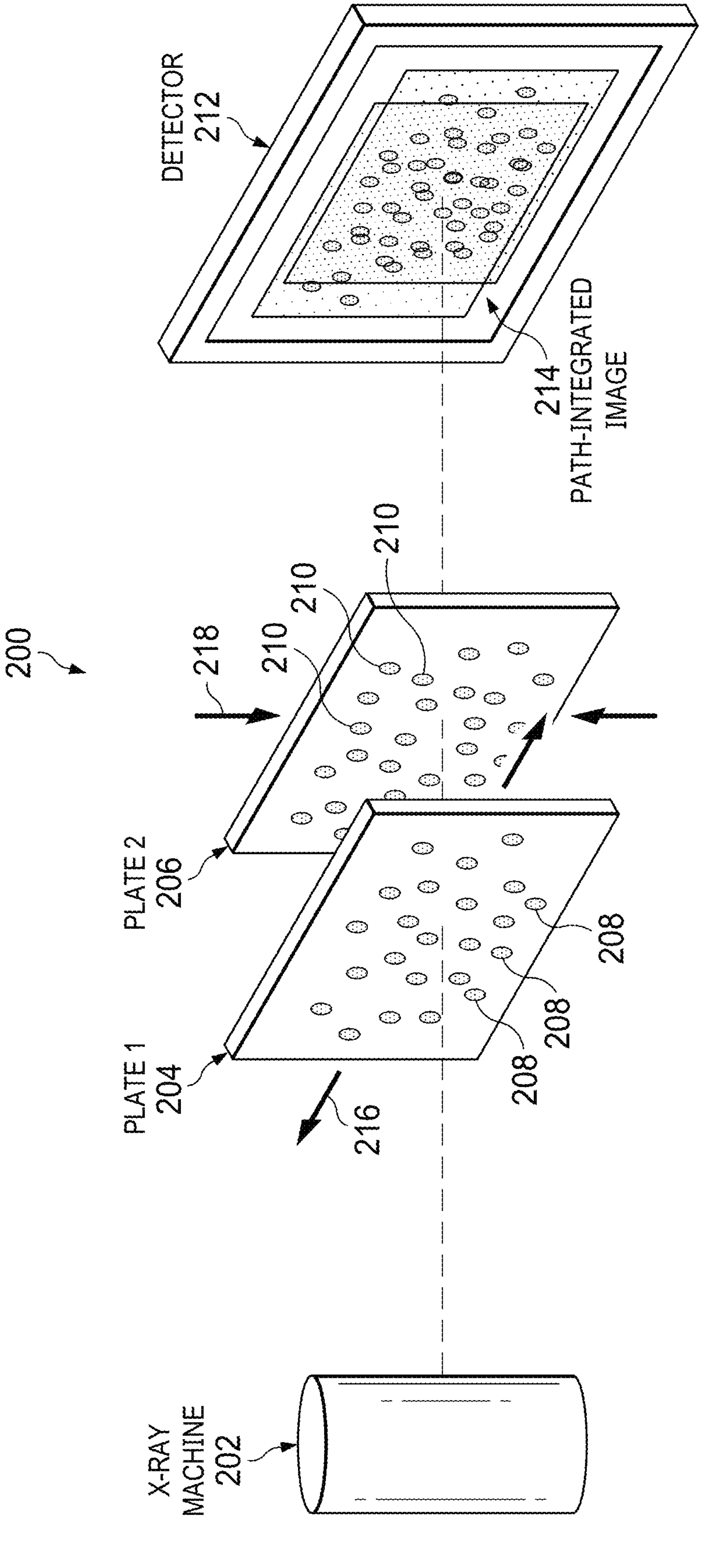
FIG. 2 depicts a setup for X-ray DIC with two extrinsic patterns applied to two test articles in accordance with an illustrative embodiment.

FIG. 2 depicts a setup for X-ray DIC with two extrinsic patterns applied to two test articles in accordance with an illustrative embodiment. Setup 200 can be implemented in multi-surface X-ray DIC system 100 in FIG. 1.

In the present example, setup 200 comprises two test sample plates 204, 206 arranged in tandem. Each test sample plate 204, 206 comprise a unique extrinsic X-ray attenuating patterns 208, 210. Deformation is applied to the test sample plates 204, 206 as indicated by arrows 216, 218, respectively. Deformation can take the form of rigid body motion and/or warping under load. In the present example, test sample plate 1 204 is stretched along the x axis (horizontal), and test sample plate 2 206 is stretched along the y axis (vertical). It should be noted that the specific setup shown in FIG. 2 is just an example of a possible set up for PI-DIC.

An X-ray machine 202 irradiates the test sample plates 204, 206 concurrently, which is detected by detector 212 to produce a path-integrated image 214 in which the two unique X-ray attenuating patterns 208, 210 are superimposed. The X-ray machine 202 first irradiates the test sample plates 204, 206 before the deformation is applied to obtain an undeformed image. X-ray irradiation is then applied during deformation to generate a number of deformed images.

In PI-DIC, conservation of intensity is reframed for path-integrated images based on an approximation of the Beer-Lambert law. Specifically, the matching or correlation criterion for DIC is reformulated to express the intensity of the path-integrated image as a function of X-ray attenuation through two DIC patterns. This fundamental alteration at the core of DIC allows deformation of two independent surfaces to be measured from a single series of path-integrated images. Compared to single-surface X-ray DIC, PI-DIC separates and measures deformation of multiple surfaces, thereby allowing more information to be garnered from a test. It also relaxes constraints on the experimental setup regarding other components in the X-ray path. Compared to DVC and P-DVC (Projection DVC), no computed tomography (CT) or volumetric reconstruction is required, and only one (for 2D-PI-DIC) or two (for stereo-PI-DIC) X-ray imaging systems are needed, reducing equipment and facilities requirements. Additionally, only the surfaces of interest need to be patterned, minimizing the intrusiveness of the X-ray DIC pattern for homogeneous specimens. Lastly, PI-DIC provides time-resolved measurements of dynamic events, similar to single-surface X-ray DIC and P-DVC, but in contrast to quasi-static DVC. Thus, PI-DIC is a novel diagnostic and fills a niche that is not currently covered by other measurement methods.

Figure 3:
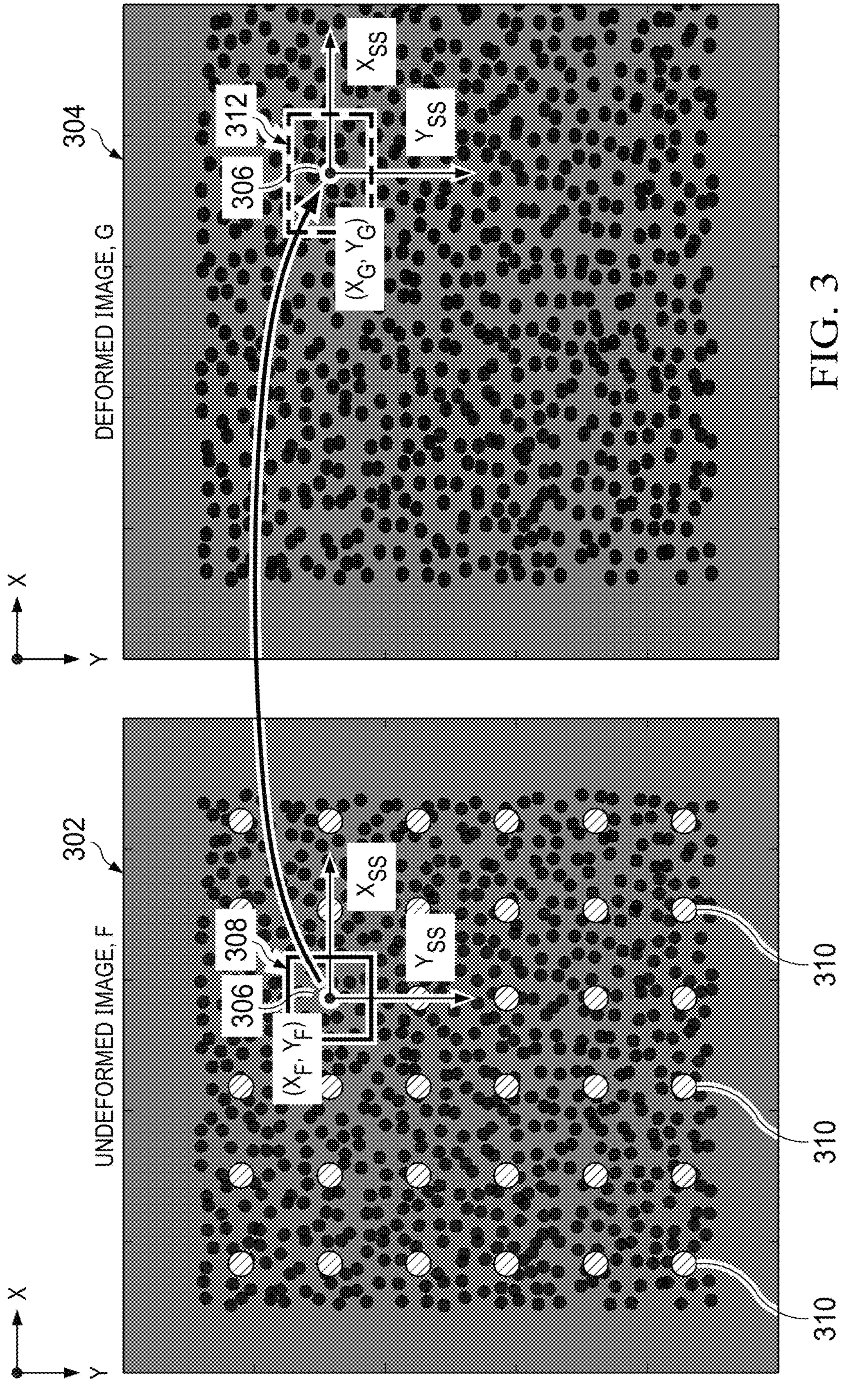
FIG. 3 depicts a diagram illustrating conservation of intensity for a test sample that has been deformed in accordance with standard optical DIC.

FIG. 3 depicts a diagram illustrating conservation of intensity for a test sample that has been deformed in accordance with standard optical DIC. Conservation of intensity, or optical flow, is illustrated in FIG. 3 for an example wherein an image is stretched horizontally. The image coordinate system has origin at the top-left pixel of the image and is defined by axes $\mathbb{X}$ and $\mathbb{Y}$. Optical flow dictates that the intensity of the undeformed image F 302 at a reference location 306 in the image coordinate system, $(X_F, Y_F)$, should equal the intensity of the deformed image G 304 at its new position, $(X_G, Y_G)$:

$$F(X_F, Y_F)=G(X_G, Y_G) \quad \text{Eq. 1}$$

Because of the so-called aperture problem, the displacement of a single pixel cannot typically be determined. Therefore, local DIC analysis tracks small regions around the pixels of interest, called subsets, with one representative undeformed subset illustrated by box 308 in FIG. 3. The coordinates of the subset centers, $(X_F, Y_F)$, are typically user defined as a grid of points in the undeformed image coordinate system, illustrated by circles 310 in FIG. 3. A subset coordinate system is also defined for each subset, with origin at the center of the subset and with axes $\mathbb{X}_{SS}$ and $\mathbb{Y}_{SS}$.

A subset shape function approximates the deformation of the subset between the undeformed and deformed image, illustrated by the elongated box 312 in FIG. 3.

To compute the mismatch in intensity between the undeformed and deformed subsets, a matching criterion is formulated (also called a correlation criterion or a cost function), such as the Sum-of-Squared-Differences (SSD):

$$\Psi^2=\Sigma_\Omega\{G(X_{SS,G}, Y_{SS,G})-F(X_{SS,F}, Y_{SS,F})\}^2 \quad \text{Eq. 2}$$

where $\Psi$ is the value of the matching criterion, and $(X_{SS,F}, Y_{SS,F})$ are the coordinates of pixels in the undeformed subset in the image coordinate system. The sum is carried out over all the pixels in the subset, $\Omega$. An optimization algorithm (e.g., steepest descent, Newton-Raphson, Gauss-Newton, Levenberg-Marquardt) is employed to identify the parameters $\underline{P}^*$ that minimize the value of the matching criterion Ψ:

$$\underline{P}^* = \underset{\underline{P}}{\operatorname{argmin}}(\Psi) \quad \text{Eq. 3}$$

The correlation process is performed with the reference image F and the series of deformed images, G.

In contrast to optical DIC illustrated in FIG. 3, the conservation of intensity described above is often violated for path-integrated X-ray images.

X-ray images are path-integrated since all objects/materials between the X-ray machine and the detector attenuate the X-rays to some extent and contribute to the final image intensity. The Beer-Lambert law for monochromatic X-rays specifies the intensity, $I_{PI}$, of the transmitted X-rays through the relationship:

$$I_{PI} = I_0 \exp\left\{-\sum_{k=1}^{N_k} (\mu_k l_k)\right\} \quad \text{Eq. 4}$$

where $I_0$ is the unimpeded X-ray intensity, $\mu_k$ and $l_k$ are the material attenuation coefficient and path length, respectively, for a given material/object k, and the sum is carried out for $N_k$ materials/objects in the path.

PI-DIC is developed for the exemplar setup shown in FIG. 2, wherein two weakly attenuating plates 204, 206 (e.g., plastic or aluminum) with strongly X-ray attenuating extrinsic DIC pattern features 208, 210 (e.g., steel or tantalum) are placed between the X-ray machine 202 and the detector 214. Assuming the attenuation of X-rays due to air is negligible compared to the plate and feature materials (i.e., $I=I_0$ for X-rays passing only through air), the summation in equation 4 can be separated into two summations, one for each sequential plate, as:

$$I_{PI} = I_0 \exp\left\{-\sum_{k_1=1}^{N_{k_1}} (\mu_{k_1} l_{k_1}) + \sum_{k_2=1}^{N_{k_2}} (\mu_{k_2} l_{k_2})\right\} \quad \text{Eq. 5}$$

where the subscripts 1 and 2 refer to each plate, respectively.

The transmitted intensity of X-rays passing through both plates sequentially, $I_{PI}$, can be written in terms of the intensity transmitted through each single plate individually as:

$$I_{PI} = \frac{1}{I_0} I_1 I_2 \quad \text{Eq. 6}$$

When the transmitted X-rays impinge upon the digital detector, the signal is discretized into individual pixels located at position ($X_F$, $Y_F$) in the image coordinates. Assuming the image intensity, $F_{PI}$, is linearly proportional to the X-ray intensity, $I_{PI}$, equation 6 can be written in terms of image intensities as:

$$F_{PI}^C(X_{F_{PI}}, Y_{F_{PI}}) = \frac{1}{I_0}[F_1(X_{F_1}, Y_{F_1})][F_2(X_{F_2}, Y_{F_2})] \quad \text{Eq. 7}$$

where $$F_{PI}^C$$

is the composition of the path-integrated image, and $F_1$ and $F_2$ represent reference images of each plate individually.

Equation 7 is an approximation of the Beer-Lambert law and assumes the following: (1) a monochromatic X-ray source (rather than the common polychromatic lab sources) is used; (2) the image intensity is linearly proportional to the X-ray intensity; (3) air attenuation of X-rays is negligible compared to the plate and feature materials (e.g., aluminum and tantalum, respectively); (4) the change in image intensity due to the emittance angle of the X-rays is negligible; (5) spatial variations of the X-ray and/or image intensity are corrected during image preprocessing.

To preserve the conservation of intensity for path-integrated images, the independent deformation of each plate is related to the deformed, path-integrated image, $G_{PI}$. The problem is formulated in a Lagrangian framework, first tracking material points on Plate 1 and then repeating the process to track material points on Plate 2.

Figure 4:
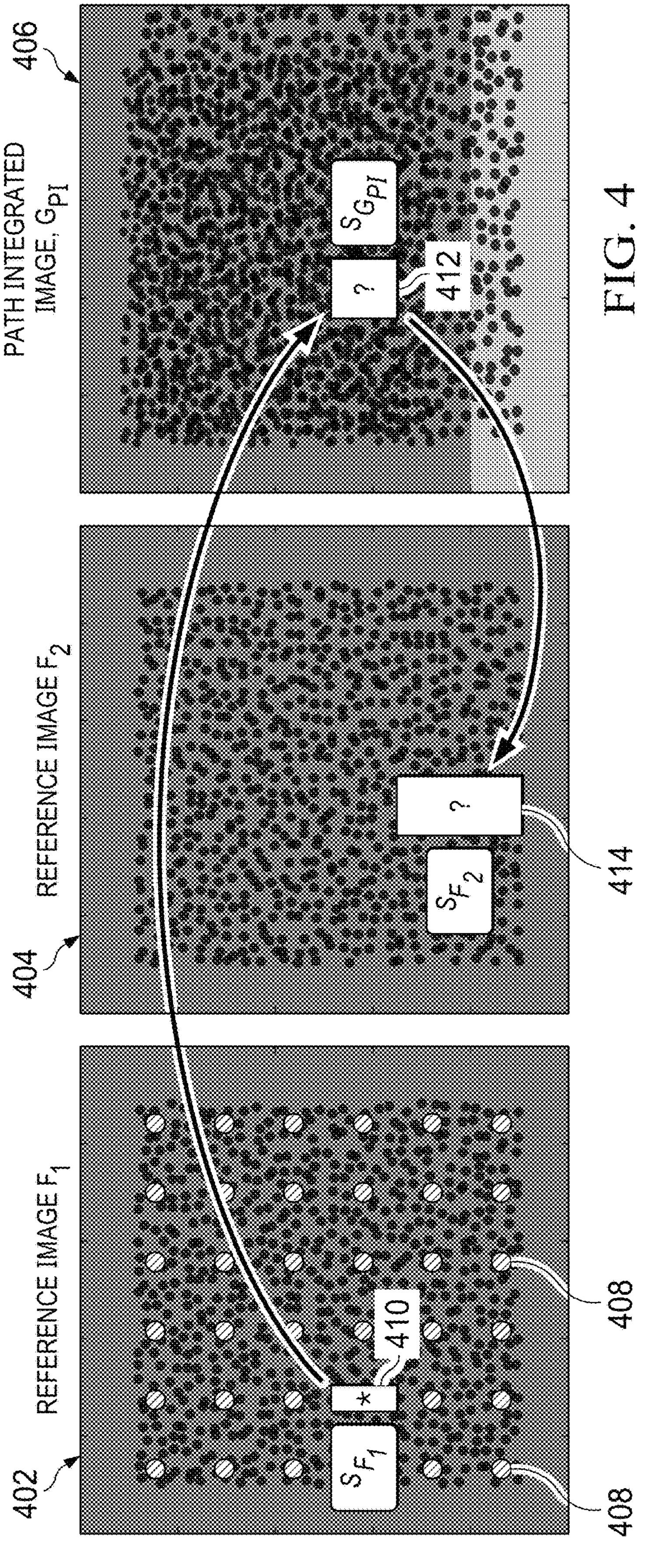
FIG. 4 depicts a correlation process for Path Integrated Digital Image Correlation (PI-DIC) in accordance with an illustrative embodiment.

FIG. 4 depicts a correlation process for PI-DIC in accordance with an illustrative embodiment. FIG. 4 illustrates an example wherein Plate 1 204 is stretched horizontally to the right and Plate 2 206 is compressed vertically upwards. The warped subset shapes for $S_{F_1}$ and $S_{F_2}$ are exaggerated for illustrative purposes.

Similar to standard DIC, a grid of interrogation points is defined on the undeformed reference image 402 for the first plate, $F_1$, based on the region-of-interest and a prescribed step size. These interrogation points 408 are located at the subset centers.

For each subset in $F_1$, e.g., starred subset, $S_{F_1}$ 410, a corresponding subset exists in the deformed, path-integrated image, $G_{PI}$ 406, labeled as the subset, $S_{G_{PI}}$ 412.

The intensity of subset $S_{G_{PI}}$ 412 is a function of X-ray attenuation through both plates. Therefore, the corresponding subset in the second plate image, $F_2$ 404, is also identified, labeled as subset $S_{F_2}$ 414.

In this example, two independent deformations from Plate 1 and Plate 2 are identified from three unique subsets ($S_{F_1}$, $S_{F_2}$, and $S_{G_{PI}}$). The coordinates of the center point of the subset $S_{F_1}$ 410, ($X_{F_1}$, $Y_{F_1}$), are prescribed when the grid of interrogation points is defined on the undeformed reference image for the first plate. Therefore, the center of subset $S_{F_1}$ 410 is stationary and cannot translate within the image. However, the subset $S_{F_1}$ 410 is allowed to warp because Plate 1 204 is deforming. This warping is shown qualitatively in FIG. 4 by the horizontally compressed subset $S_{F_1}$ 410 (compared to the square subset $S_{G_{PI}}$ 412), and is described mathematically as:

$$X_{SS,F_1} = X_{F_1} + X_{SS} + P_{XX,F_1} X_{SS} + P_{XY,F_1} Y_{SS}$$

$$Y_{SS,F_1} = Y_{F_1} + Y_{SS} + P_{YX,F_1} X_{SS} + P_{YY,F_1} Y_{SS} \quad \text{Eq. 8}$$

where ($X_{SS,F_1}$, $Y_{SS,F_1}$) are the coordinates of the pixels within subset $S_{F_1}$ 410 in the image coordinate system, ($X_{F_1}$, $Y_{F_1}$) are the user-defined coordinates of the center of the subset in the image coordinate system, ($X_{SS}$, $Y_{SS}$) are the coordinates of the pixels within the subset in the subset coordinate system, and the parameters [$P_{XX,F_1}$, $P_{XY,F_1}$, $P_{YX,F_1}$, $P_{YY,F_1}$] are the four warping parameters of the affine shape function.

The location of the corresponding subset $S_{F_2}$ 414 can be anywhere in the image $F_2$ 404, and the subset can warp as Plate 2 206 undergoes independent deformation. This behavior is shown qualitatively in FIG. 4 by the vertically elongated subset $S_{F_2}$ 414 (compared to the square subset $S_{G_{PI}}$ 412), and is described mathematically as:

$$X_{SS,F_2}=X_{F_1}+X_{SS}+U_{F_2}+P_{XX,F_2}X_{SS}+P_{XY,F_2}Y_{SS}$$

$$Y_{SS,F_2}=Y_{F_1}+Y_{SS}+V_{F_2}+P_{YX,F_2}X_{SS}+P_{YY,F_2}Y_{SS} \quad \text{Eq. 9}$$

where $U_{F_2}$ and $V_{F_2}$ are the two translation parameters of the affine shape function, and all other terms are the same as described above, but now applied to subset $S_{F_2}$ 414.

Finally, the location of the deformed, path-integrated subset, $S_{G_{PI}}$ 412, can be anywhere in the image $G_{PI}$, but is not allowed to warp. Thus, the subset $S_{G_{PI}}$ 412 is shown as a square with the user-defined subset size in FIG. 4. This behavior is described mathematically as:

$$X_{SS,G_{PI}}=X_{F_1}+X_{SS}+U_{G_{PI}}$$

$$Y_{SS,G_{PI}}=Y_{F_1}+Y_{SS}+V_{G_{PI}} \quad \text{Eq. 10}$$

where $U_{G_{PI}}$ and $V_{G_{PI}}$ are the two translation parameters of the affine shape function. In sum, there are 12 parameters that are identified to describe the affine deformation of the two individual plates:

$$\underline{P}_{PI}=\left[P_{XX,F_1},P_{XY,F_1},P_{YX,F_1},P_{YY,F_1},U_{F_2},V_{F_2},P_{XX,F_2},P_{XY,F_2},P_{YX,F_2},P_{YY,F_2},U_{G_{PI}},V_{G_{PI}}\right]$$

The matching criterion for the two-plate, path-integrated, X-ray DIC, $\Psi_{PI}$, is given by:

$$\Psi_{PI}^2=\sum_{\Omega}\left\{G_{PI}\left(X_{SS,G_{PI}},Y_{SS,G_{PI}}\right)-F_{PI}^{C}\left(X_{SSfPI},Y_{SSfPI}\right)\right\}^2 \quad \text{Eq. 11}$$

Figure 5:
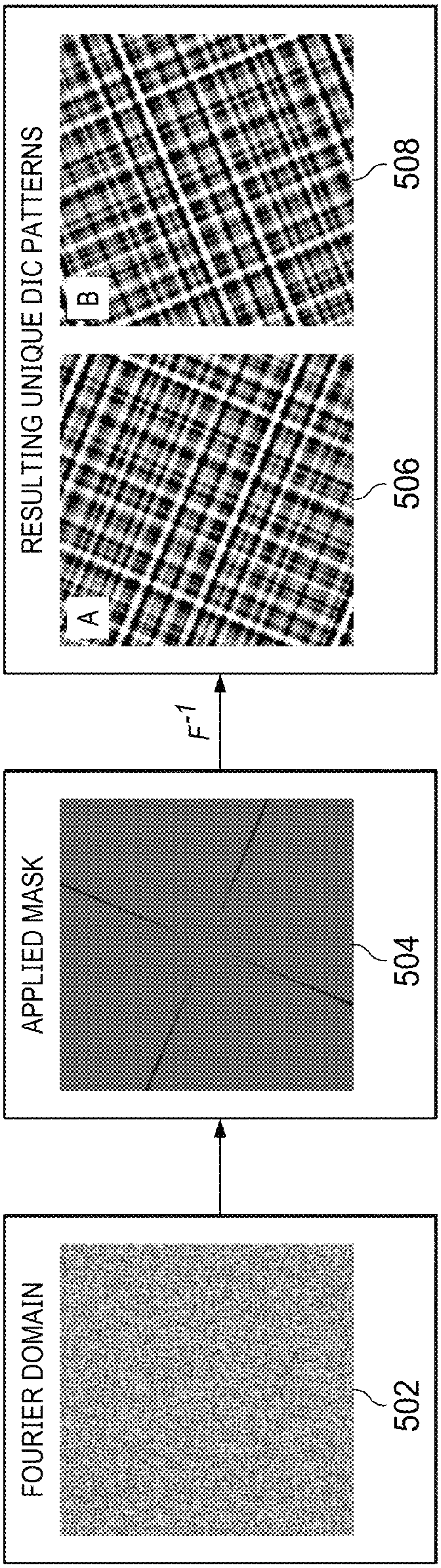
FIG. 5 depicts a graphical routine for generating two pseudo-random DIC patterns with unique and separable spatial frequency content from a random pattern in the Fourier domain in accordance with an illustrative embodiment.
Figure 6:
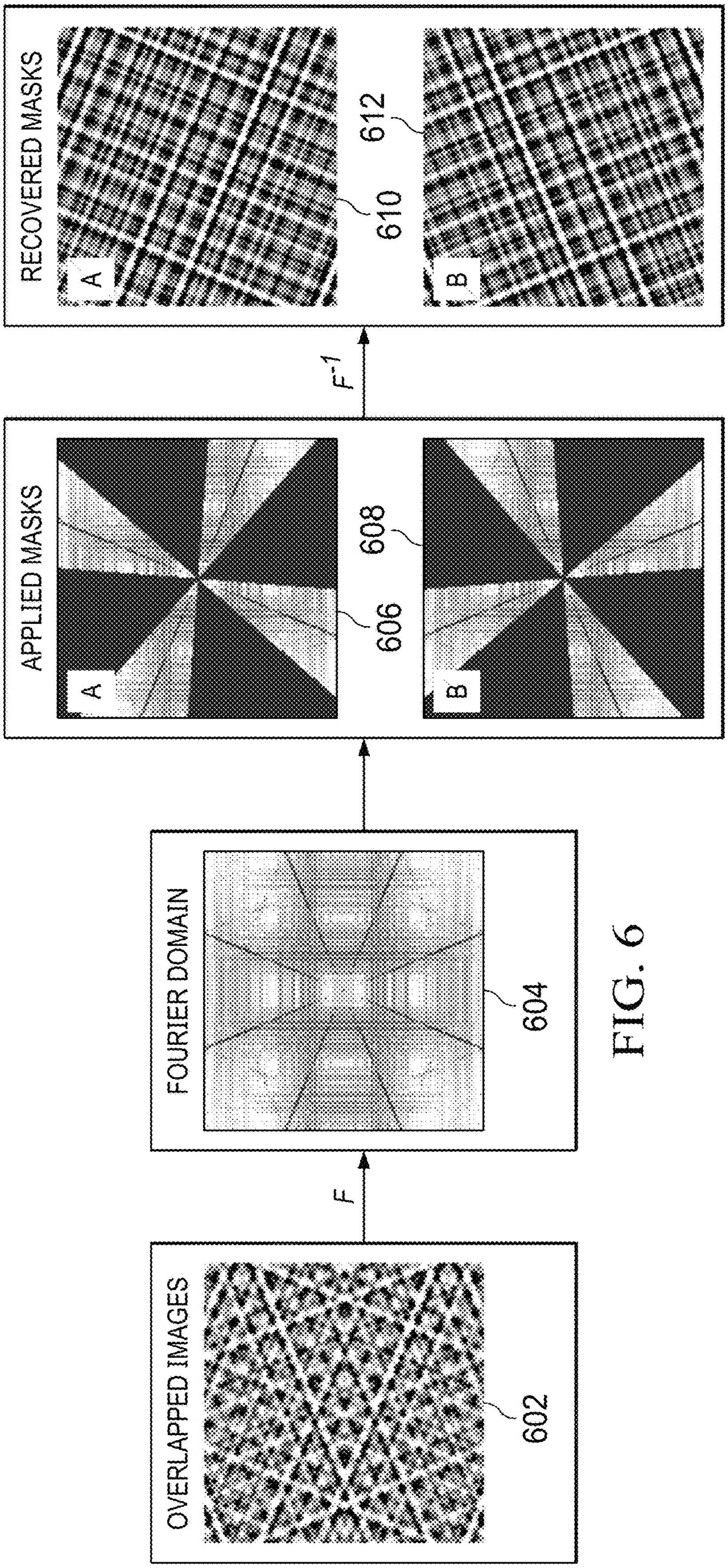
FIG. 6 depicts a process of pattern separation for a random Fourier domain in accordance with an illustrative embodiment.
Figure 7:
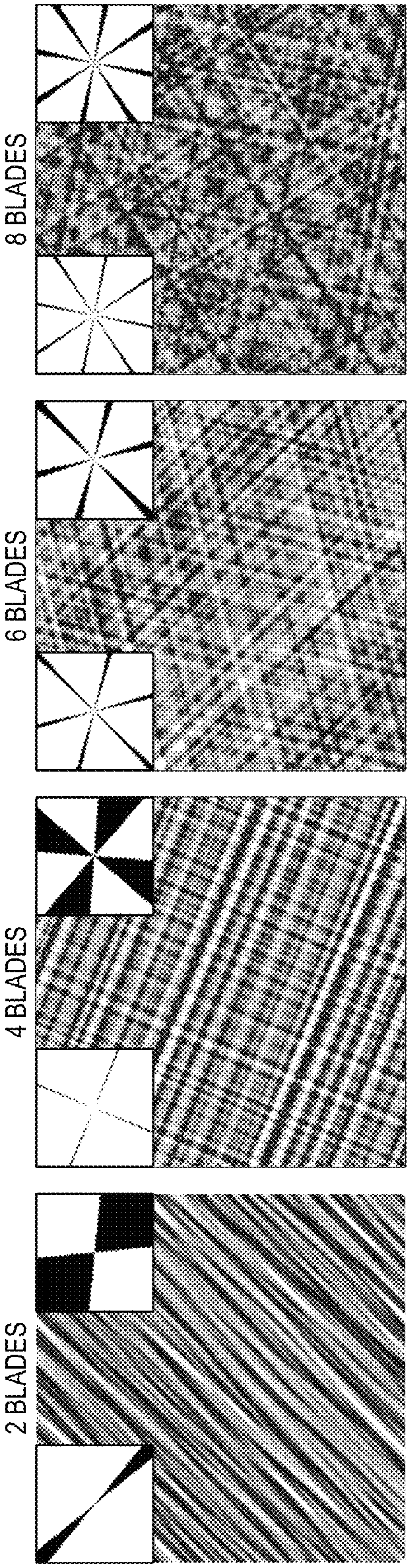
FIG. 7 depicts sample masked with varied characteristics superimposed on respective spatial patterns in accordance with an illustrative embodiment.

FIGS. 5-7 relate to a method of X-ray DIC utilizing a random Fourier domain.

FIG. 5 depicts a graphical routine for generating two pseudo-random DIC patterns with unique and separable spatial frequency content from a random pattern in the Fourier domain in accordance with an illustrative embodiment. First, a random pattern 502 is generated in the Fourier domain, and then a binary mask 504 comprising varying number of azimuthal segments (also called blades) of varying widths is applied to the random pattern 502 to retain certain spatial frequencies. The inverse fast Fourier transform (IFFT) is performed on the masked random pattern to generate a pseudo-random spatial pattern with a unique frequency signature pattern 506 (Pattern A). The second pattern 508 (Pattern B) is generated by mirroring the first pattern 506 about the vertical axis, thereby retaining identical spatial characteristics but unique frequency content.

FIG. 6 depicts a process of pattern separation for a random Fourier domain in accordance with an illustrative embodiment. The separation process begins with an overlapped image 602 formed by superimposing spatial patterns A 506 and B 508 from FIG. 5. The Fourier domain 604 of the overlapped image 602 is computed. Recovery masks 606, 608 are applied to the frequency information, and the IFFT is computed to recover the images of Pattern A 610 and Pattern B 612.

In the present example, the recovery masks 606, 608 have wider blades than the original binary mask 504 shown in FIG. 5. Because Pattern B 508 was created by mirroring Pattern A 506, the recovery masks 606, 608 used for pattern recovery are also mirrored. Comparing the original Patterns A 506 and B 508 from FIG. 5 to the recovered Patterns A 610 and B 612 in FIG. 6, the method qualitatively recovers the same patterns.

A variety of patterns can be generated by varying the mask characteristics (mask optimization), including the number of blades, the angular width of blades for the pattern generation mask, the angular width of blades for the pattern recovery mask, and the clocking orientation of the blades about the center of the image, subject to the following constraints: The number of blades (e.g., 2, 4, 6, or 8) remain the same for both the generation and recovery masks. The angular width of the blade for the generation mask can vary from the widest possible blade (e.g., 90° for two blades) to >0°. The width of the blade used for the recovery patterns can vary from the widest blade to the width of the blade used for the generation mask (i.e., the blades in the recovery mask are never narrower than the blades in the generation mask).

FIG. 7 depicts sample masked with varied characteristics superimposed on respective spatial patterns in accordance with an illustrative embodiment. Patterns from each blade number are shown using the specified blade widths. The upper left inset for each spatial pattern shows the respective generation mask, and the upper right inset shows the respective recovery mask.

Figure 8:
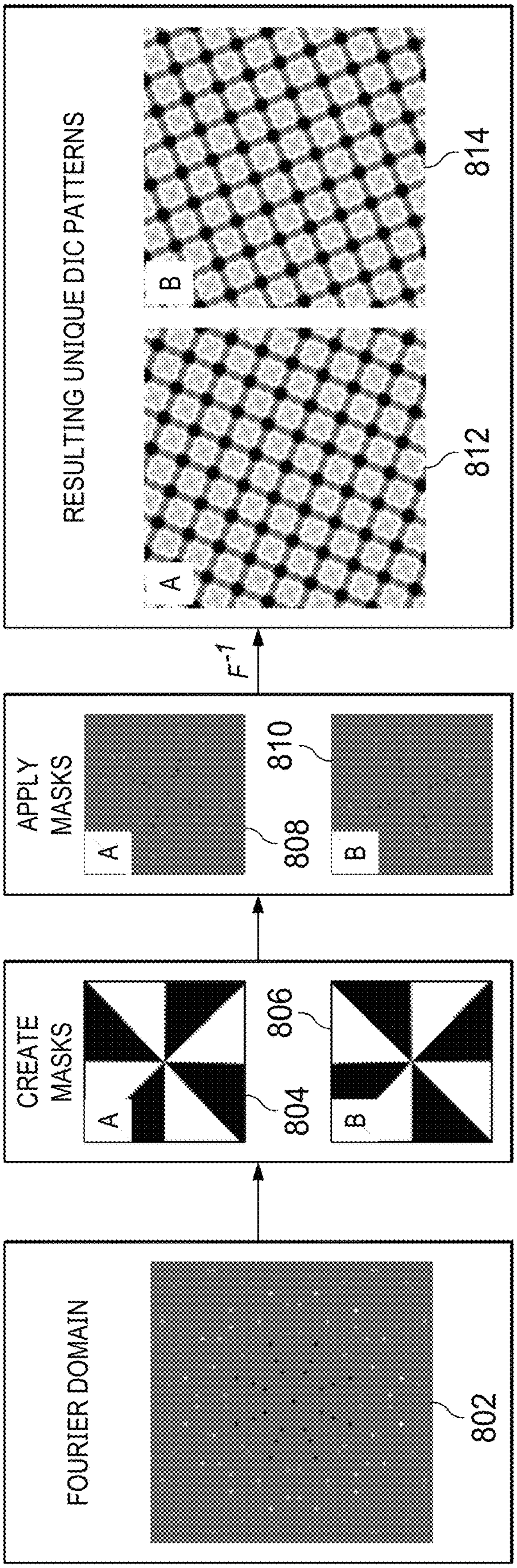
FIG. 8 depicts a graphical routing for generating two sinusoidal DIC patterns from a controlled pattern in the Fourier domain in accordance with an illustrative embodiment.
Figure 9:
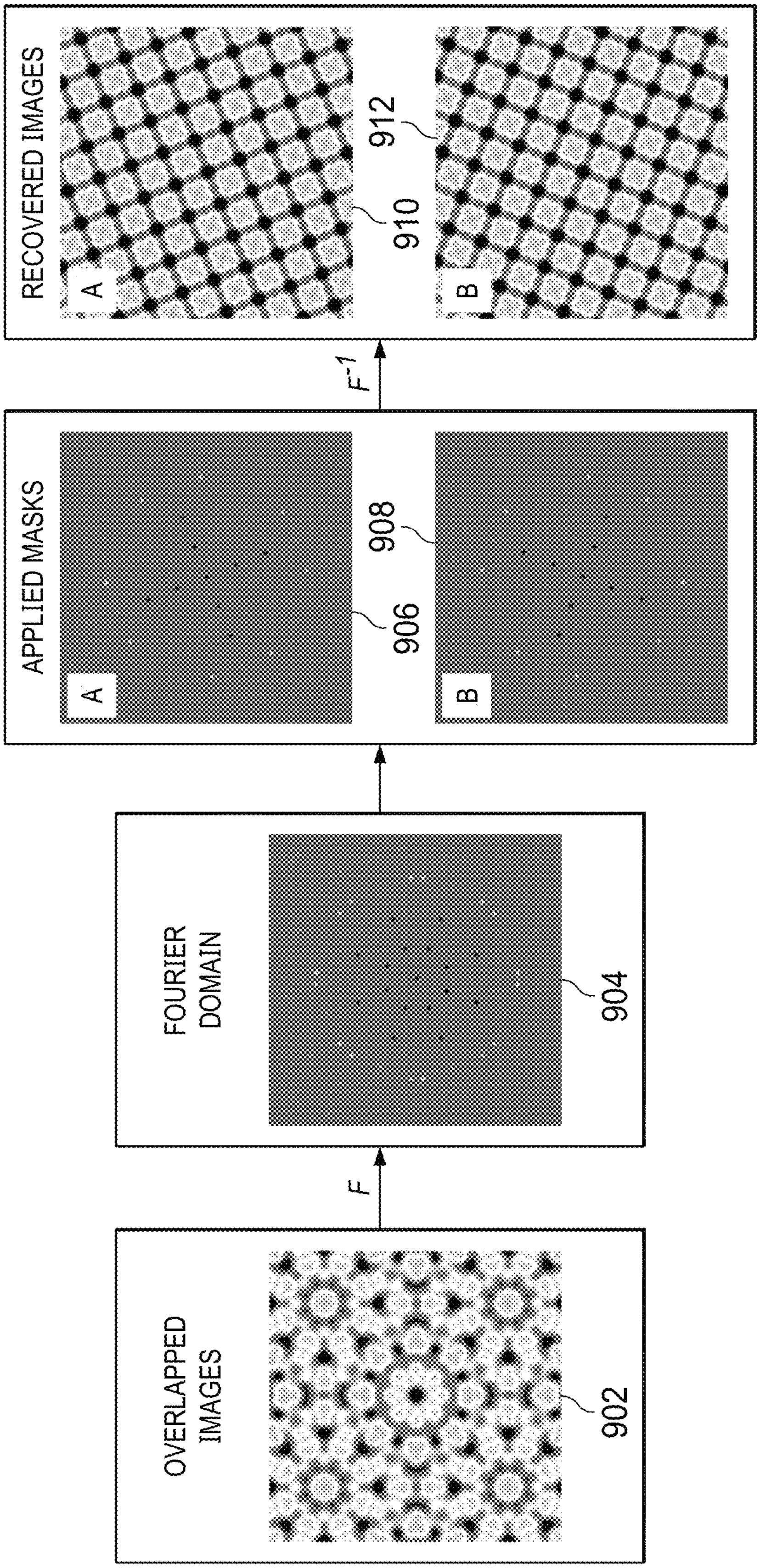
FIG. 9 depicts a process of pattern separation for a controlled Fourier domain in accordance with an illustrative embodiment.
Figure 10:
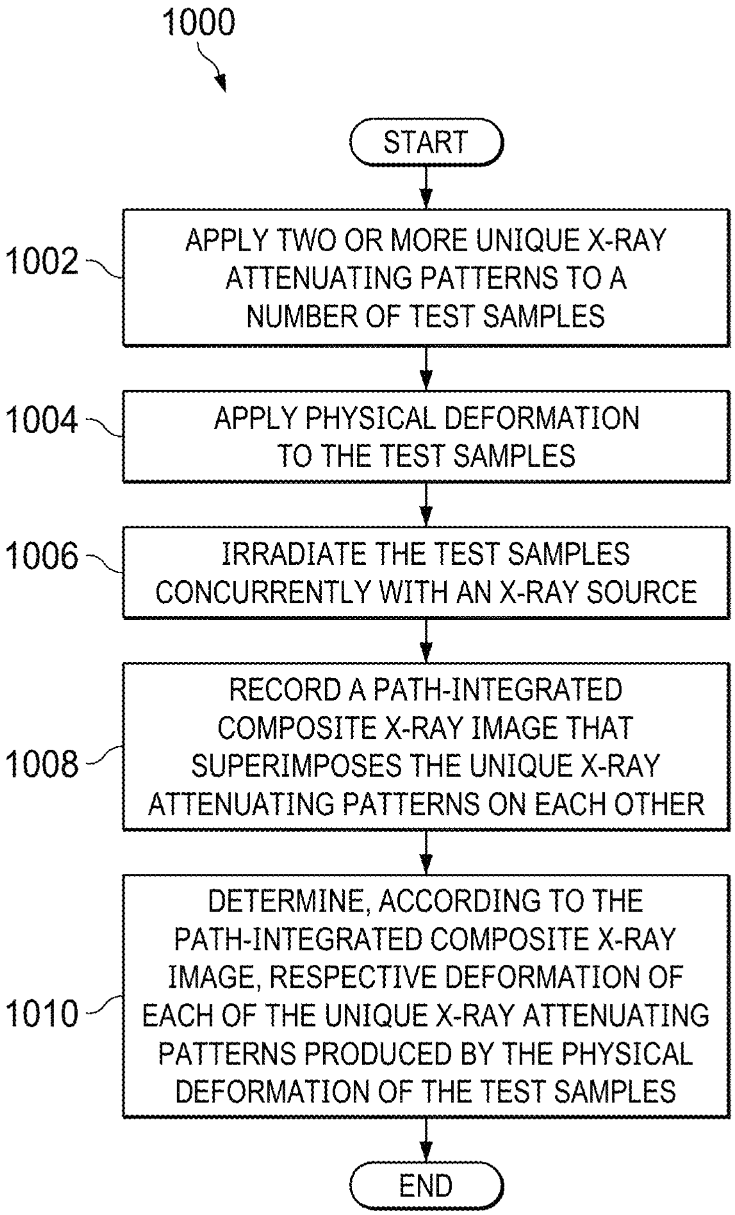
FIG. 10 depicts a flowchart illustrating a process for multi-surface X-ray digital image correlation in accordance with illustrative embodiments.

FIGS. 8-10 relate to the second method of X-ray DIC utilizing a controlled Fourier domain.

FIG. 8 depicts a graphical routing for generating two sinusoidal DIC patterns from a controlled pattern in the Fourier domain in accordance with an illustrative embodiment. The controlled pattern method uses a specific controlled pattern 802 in the Fourier domain. To produce consistent repeating patterns without the presence of low underlying frequencies, the frequency information is placed on single pixels along lines radiating from the center of the image.

Binary masks 804, 806 are designed filter out respective regions in the Fourier domain. In the present example, binary masks 804, 806 comprise four blades each. Binary masks A 804 and B 806 are inverted to filter opposite regions of the controlled pattern 802 during application 808, 810.

The IFFT is then performed to generate spatial patterns 812, 814 of orthogonal sine waves.

FIG. 9 depicts a process of pattern separation for a controlled Fourier domain in accordance with an illustrative embodiment. The process begins with an overlapped image 902 formed by superimposing spatial patterns A 812 and B 814 from FIG. 8. The FFT is applied to the overlapped image 902 to compute the Fourier domain 904. Frequency masks 906, 908 are applied to the Fourier domain 904, and the IFFT is computed to recover the original DIC patterns 910, 912 with some associated error.

Similar to the random patterns, a variety of spatial patterns can be generated by varying characteristics of the controlled Fourier domain information, including the clocking orientation of the line of non-zero pixels and the radial spacing of the pixels. Rotating the clocking orientation so the resulting periodic patterns are misaligned with the image axes can eliminate the bias in the DIC results.

FIG. 10 depicts a flowchart illustrating a process for multi-surface X-ray digital image correlation in accordance with illustrative embodiments. Process 1000 might be implemented in multi-surface X-ray DIC system 100 shown in FIG. 1.

Process 1000 begins by applying two or more unique X-ray attenuating patterns to a number of test samples (step 1002). The X-ray attenuating patterns include at least one extrinsic pattern. The X-ray attenuating patterns might comprise two or more extrinsic patterns, wherein each extrinsic pattern is applied to a different test sample (i.e., one extrinsic pattern is applied to a first test sample, a second extrinsic pattern is applied to a second test sample, and so on). Alternatively, each extrinsic pattern is applied to a different surface of the same test sample (i.e., one extrinsic pattern is applied to a first surface of a test sample, and the other extrinsic pattern is applied to a second surface of the same test sample. Alternatively, the X-ray attenuating patterns might comprise one or more extrinsic patterns and an intrinsic pattern. The X-ray attenuating patterns might be random or designed to have unique Fourier signatures.

Physical deformation is then applied to the test samples (step 1004). The physical deformation might comprise rigid body motion and/or warping.

The test samples are irradiated concurrently with an X-ray source (step 1006), and a path-integrated composite X-ray image is recorded that superimposes the unique X-ray attenuating patterns on each other (step 1008).

Respective deformation of each of the unique X-ray attenuating patterns produced by the physical deformation of the test samples is determined according to the path-integrated composite X-ray image (step 1010). Process 1000 then ends.

Figure 11:
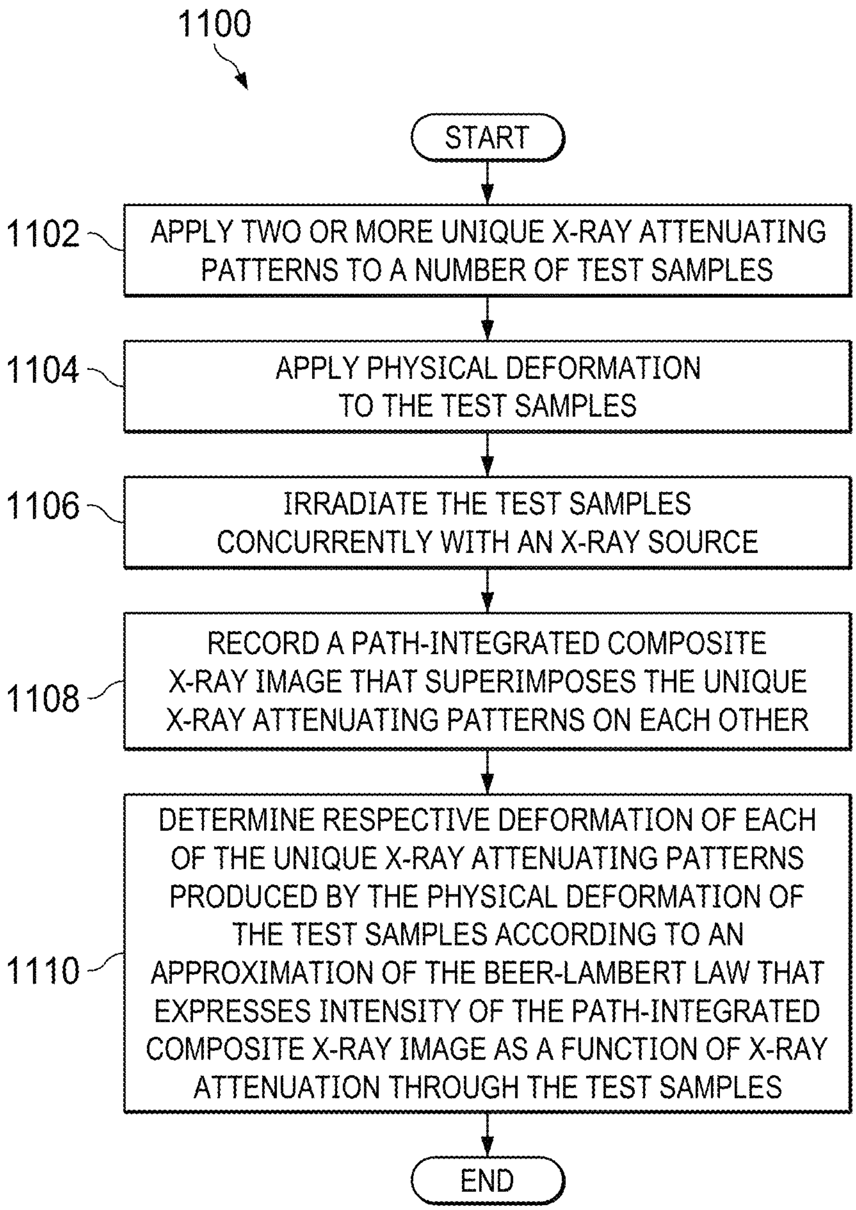
FIG. 11 depicts a flowchart illustrating a process for Path-Integrated digital image correlation using the Beer-Lambert law in accordance with illustrative embodiments.

FIG. 11 depicts a flowchart illustrating a process for digital image correlation using the Beer-Lambert law in accordance with illustrative embodiments. Process 1100 might be implemented in multi-surface X-ray DIC system 100 shown in FIG. 1.

Process 1100 begins by applying two or more unique X-ray attenuating patterns to a number of test samples (step 1102). The X-ray attenuating patterns might comprise two or more extrinsic patterns. Alternatively, the X-ray attenuating patterns might comprise two or more extrinsic patterns and an intrinsic pattern. The X-ray attenuating patterns might be random.

Physical deformation is then applied to the test samples (step 1104). The physical deformation might comprise rigid body motion and/or warping.

The test samples are irradiated concurrently with an X-ray source (step 1106), and a path-integrated composite X-ray image is recorded that superimposes the unique X-ray attenuating patterns on each other (step 1108).

The respective deformation of each of the unique X-ray attenuating patterns produced by the physical deformation of the test samples is determined according to an approximation of the Beer-Lambert law that expresses intensity of the path-integrated composite X-ray image as a function of X-ray attenuation through the test samples (see Eq. 7) (step 1110). Process 1100 then ends.

Figure 12:
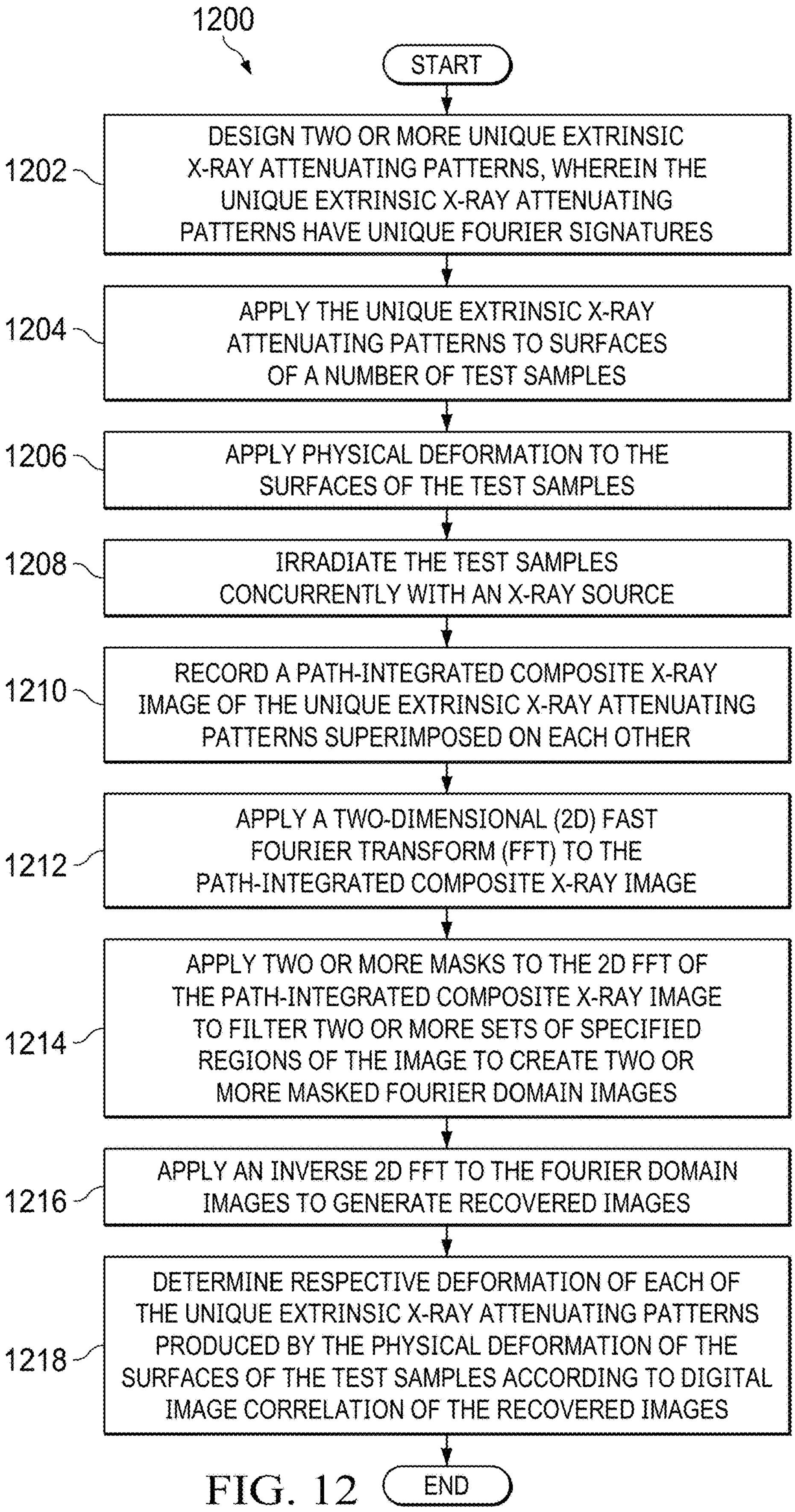
FIG. 12 depicts a flowchart illustrating a process for Frequency-Multiplexed digital image correlation according to the Fourier domain in accordance with illustrative embodiments.

FIG. 12 depicts a flowchart illustrating a process for Frequency-Multiplexed digital image correlation according to the Fourier domain in accordance with illustrative embodiments. Process 1200 might be implemented in multi-surface X-ray DIC system 100 shown in FIG. 1.

Process 1200 begins by designing two or more unique extrinsic X-ray attenuating patterns, wherein the unique extrinsic X-ray attenuating patterns have unique Fourier signatures (step 1202). The unique extrinsic X-ray attenuating patterns are then applied to surfaces of a number of test samples (step 1204). The unique extrinsic X-ray attenuating patterns might be applied to respective surfaces of different test samples. Alternatively, the unique extrinsic X-ray attenuating patterns might be applied to a number of surfaces of a single test sample.

Physical deformation is applied to the surfaces of the test samples (step 1206). The physical deformation might comprise rigid body motion and/or warping.

The test samples are irradiated concurrently with an X-ray source (step 1208), and a path-integrated composite X-ray image is recorded that superimposes the unique extrinsic X-ray attenuating patterns on each other (step 1210).

A two-dimensional (2D) fast Fourier transform (FFT) is applied to the path-integrated composite X-ray image (step 1212). Two or more masks are applied to the 2D FFT of the path-integrated composite X-ray image to filter two or more sets of specified regions of the composite X-ray image to create two or more masked Fourier domain images (step 1214). The different masks might filter opposing segments of the image. The azimuthal width of each filtered segment of the masks might vary in angle from 0 degrees to 90 degrees. The azimuthal orientation of each filtered segment of the masks might vary. The number of filtered segments is variable.

An inverse 2D FFT is then applied to the Fourier domain images to generate recovered images (step 1216). Step 1212-1216 might be repeated for a specified number of iterations.

Respective deformation of each of the unique extrinsic X-ray attenuating patterns produced by the physical deformation of the surfaces of the test samples is determined according to digital image correlation of the recovered images (step 1218).

Process 1200 then ends.

Figure 13:
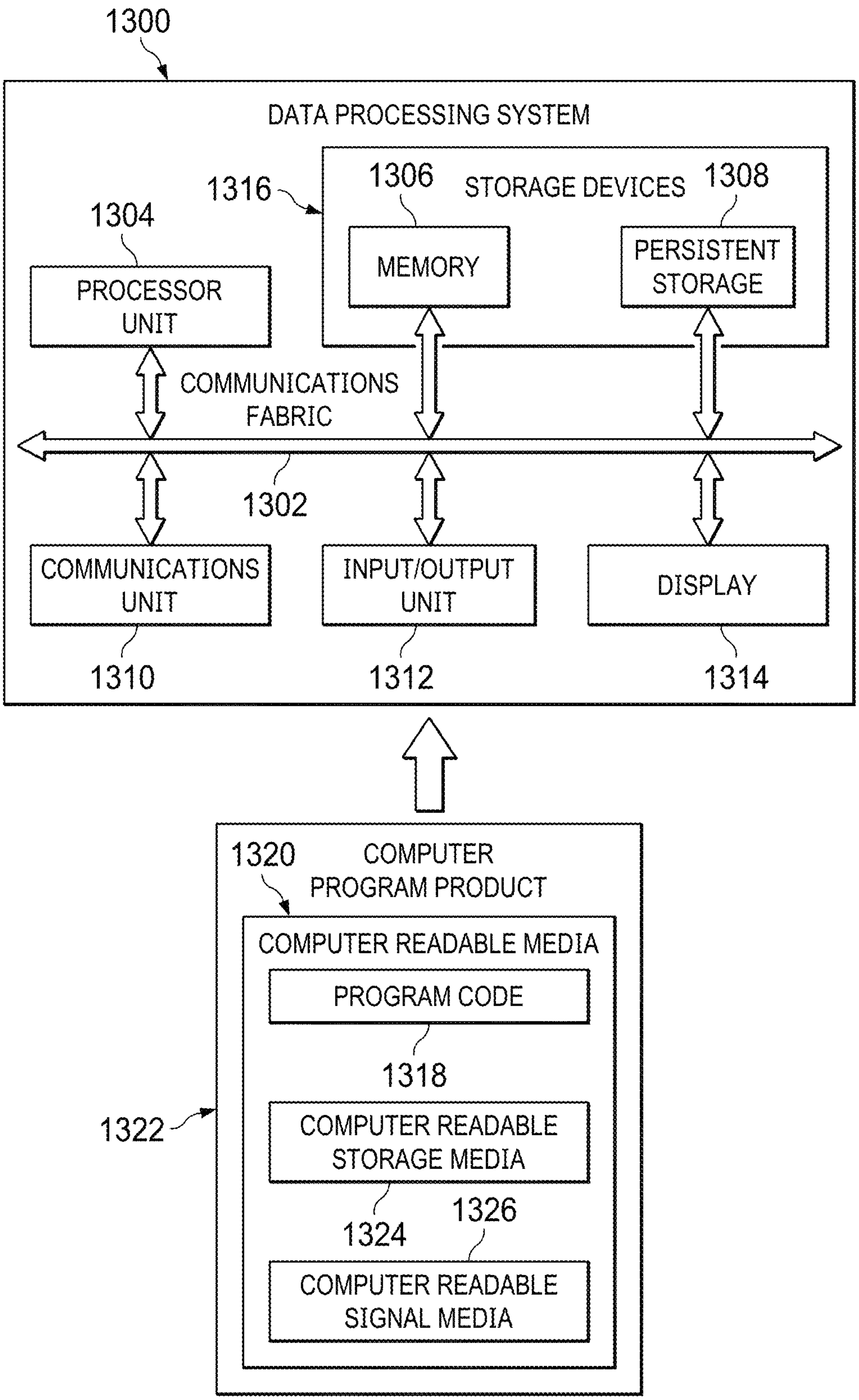
FIG. 13 is a diagram of a data processing system depicted in accordance with an illustrative embodiment.

Turning now to FIG. 13, an illustration of a block diagram of a data processing system is depicted in accordance with an illustrative embodiment. Data processing system 1300 may be used to implement computer system 150 in FIG. 1. In this illustrative example, data processing system 1300 includes communications fabric 1302, which provides communications between processor unit 1304, memory 1306, persistent storage 1308, communications unit 1310, input/output unit 1312, and display 1314. In this example, communications fabric 1302 may take the form of a bus system.

Processor unit 1304 serves to execute instructions for software that may be loaded into memory 1306. Processor unit 1304 may be a number of processors, a multi-processor core, or some other type of processor, depending on the particular implementation. In an embodiment, processor unit 1304 comprises one or more conventional general-purpose central processing units (CPUs). In an alternate embodiment, processor unit 1304 comprises one or more graphical processing units (GPUs).

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308. Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs may be located in storage devices 1316, which are in communication with processor unit 1304 through communications fabric 1302. The processes of the different embodiments may be performed by processor unit 1304 using computer-implemented instructions, which may be located in a memory, such as memory 1306.

These instructions are referred to as program code, computer-usable program code, or computer-readable program code that may be read and executed by a processor in processor unit 1304. The program code in the different embodiments may be embodied on different physical or computer-readable storage media, such as memory 1306 or persistent storage 1308.

Program code 1318 is located in a functional form on computer-readable media 1320 that is selectively removable and may be loaded onto or transferred to data processing system 1300 for execution by processor unit 1304. Program code 1318 and computer-readable media 1320 form computer program product 1322 in these illustrative examples. In one example, computer-readable media 1320 may be computer-readable storage media 1324 or computer-readable signal media 1326.

In these illustrative examples, computer-readable storage media 1324 is a physical or tangible storage device used to store program code 1318 rather than a medium that propagates or transmits program code 1318. Computer readable storage media 1324, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1318 may be transferred to data processing system 1300 using computer-readable signal media 1326. Computer-readable signal media 1326 may be, for example, a propagated data signal containing program code 1318. For example, computer-readable signal media 1326 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code 1318.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of digital image correlation, the method comprising:

applying two or more unique X-ray attenuating patterns to a number of test samples;

applying physical deformation to the test samples;

irradiating the test samples concurrently with an X-ray source; and recording a path-integrated composite X-ray image that superimposes the unique X-ray attenuating patterns on each other, wherein the path integrated composite X-ray image is used to determine respective deformation of each of the unique X-ray attenuating patterns produced by the physical deformation of the test samples.

2. The method of claim 1, wherein the X-ray attenuating patterns include at least one extrinsic pattern.

3. The method of claim 2, wherein the X-ray attenuating patterns comprise two or more extrinsic patterns.

4. The method of claim 3, wherein each extrinsic pattern is applied to a different test sample.

5. The method of claim 3, where each extrinsic pattern is applied to a different surface of the same test sample.

6. The method of claim 1, wherein the X-ray attenuating patterns comprise one or more extrinsic patterns and an intrinsic pattern.

7. The method of claim 1, wherein the X-ray attenuating patterns are random.

8. The method of claim 1, wherein the X-ray attenuating patterns are designed to have unique Fourier signatures.

9. The method of claim 1, wherein the physical deformation comprises at least one of:

warping; or rigid body motion.

10. A method of digital image correlation, the method comprising:

applying two or more unique X-ray attenuating patterns to a number of test samples;

applying physical deformation to the test samples;

irradiating the test samples concurrently with an X-ray source; and recording a path-integrated composite X-ray image of the unique X-ray attenuating patterns superimposed on each other, wherein the path-integrated composite X-ray image is used to determine respective deformation of each of the unique X-ray attenuating patterns produced by the physical deformation of the test samples based on an approximation of the Beer-Lambert law that expresses intensity of the path-integrated composite X-ray image as a function of X-ray attenuation through the test samples.

11. The method of claim 10, wherein the X-ray attenuating patterns comprise two or more extrinsic patterns.

12. The method of claim 10, wherein the X-ray attenuating patterns include two or more extrinsic patterns and an intrinsic pattern.

13. The method of claim 10, wherein the X-ray attenuating patterns are random.

14. The method of claim 10, wherein the physical deformation comprises at least one of:

warping; or rigid body motion.

15. A method for digital image correlation, the method comprising:

designing two or more unique extrinsic X-ray attenuating patterns, wherein the unique extrinsic X-ray attenuating patterns have unique Fourier signatures;

applying the unique extrinsic X-ray attenuating patterns to surfaces of a number of test samples;

applying physical deformation to the surfaces of the test samples;

irradiating the test samples concurrently with an X-ray source;

recording a path-integrated composite X-ray image of the unique extrinsic X-ray attenuating patterns superimposed on each other;

applying a two-dimensional (2D) fast Fourier transform (FFT) to the path-integrated composite X-ray image;

applying two or more masks to the 2D FFT of the path-integrated composite X-ray image to filter two or more sets of specified regions of the image to create two or more masked Fourier domain images; and applying an inverse 2D FFT to the Fourier domain images to generate recovered images, wherein digital image correlation of the recovered images is used to determine respective deformation of each of the unique extrinsic X-ray attenuating patterns produced by the physical deformation of the surfaces of the test samples.

16. The method of claim 15, wherein the physical deformation comprises at least one of:

warping; or rigid body motion.

17. The method of claim 15, wherein the steps of applying the 2D FFT, applying the masks, and applying the inverse 2D FFT are repeated a specified number of iterations.

18. The method of claim 15, wherein the masks filter opposing segments of the image.

19. The method of claim 18, wherein the number of filtered segments is variable.

20. The method of claim 15, wherein azimuthal width of each filtered segment of the masks varies in angle from 0 degrees to 90 degrees.

21. The method of claim 15, wherein azimuthal orientation of each filtered segment of the masks varies.

22. The method of claim 15, wherein the unique extrinsic X-ray attenuating patterns are applied to respective surfaces of different test samples.

23. The method of claim 15, wherein the unique extrinsic X-ray attenuating patterns are applied to a number of surfaces of a single test sample.

* * * * *